(12) United States Patent
Chundi et al.

(10) Patent No.: US 11,733,839 B2
(45) Date of Patent: Aug. 22, 2023

(54) CUSTOMIZED SEEK BAR (71) Applicant: Rovi Guides, Inc., San Jose, CA (US)

(72) Inventors: Charishma Chundi, Andhra Pradesh (IN); Rajendra Pandey, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 5 days.

(21) Appl. No.: 17/183,901

(22) Filed: Feb. 24, 2021

(65) Prior Publication Data
US 2022/0269385 A1 Aug. 25, 2022

(51) Int. Cl.
*G06F 3/048* (2013.01)
*G06F 3/0484* (2022.01)
*G11B 27/00* (2006.01)

(52) U.S. Cl.
CPC .......... *G06F 3/0484* (2013.01); *G11B 27/005* (2013.01)

(58) Field of Classification Search
CPC ............................ G06F 3/0484; G11B 27/005
See application file for complete search history.

(56) References Cited

U.S. PATENT DOCUMENTS

| 7,761,892 | B2 | 7/2010 | Ellis et al. | |
| 2009/0114079 | A1* | 5/2009 | Egan | G09B 15/023 84/477 R |
| 2010/0077285 | A1* | 3/2010 | Bailey | G11B 27/105 715/201 |
| 2015/0205457 | A1* | 7/2015 | Woo | G06F 3/0482 715/767 |
| 2017/0075468 | A1* | 3/2017 | Dziuk | H04L 65/764 |
| 2019/0149885 | A1* | 5/2019 | Madison | H04N 21/4312 715/838 |
| 2020/0213676 | A1* | 7/2020 | Naik Raikar | H04N 21/4325 |
| 2021/0120282 | A1* | 4/2021 | Naik Raikar | G06V 20/46 |

* cited by examiner

*Primary Examiner* — David E Choi
(74) *Attorney, Agent, or Firm* — Haley Guiliano LLP (57) ABSTRACT

Systems and methods are provided for adjusting a playback position of a media asset at a computing device. One example method includes receiving the media asset comprising a video and/or an audio component and outputting the video and/or audio component of the media asset at a first playback position at the computing device. A seek bar control is initiated and, in response to initiating the seek bar control, a grid is generated at the computing device. A user action for adjusting the playback position of the media asset is detected. The detecting the user action comprises determining a first location on the grid corresponding to a first playback position and determining a second playback position by determining that the user action has ended at a second location on the grid corresponding to the second playback position. The media asset is outputted at the second playback position.

20 Claims, 7 Drawing Sheets

CUSTOMIZED SEEK BAR

BACKGROUND

This disclosure is generally directed to media systems configured to receive and play live media content. In particular, methods and systems are provided herein for effectively controlling and adjusting the seek bar of a media asset by utilizing user actions.

SUMMARY

With the proliferation of computing devices, and in particular computing devices with touchscreens, such as mobile phones, smartphones, tablet computers and media players, there has been an increase in the number of people who wish to view video and/or audio content. When watching video and/or audio content, a user may wish to skip sections or to skip to a preferred section of the content. For example, a user may wish to skip to a preferred topic within a presentation covering a multitude of topics. Typically, a user may navigate video and/or audio content by, for example, dragging an indicator on a seek bar of a video on a touchscreen of a smartphone. However, precisely navigating from one section of a video to another section of the video may be difficult, for example, due to the size of the touchscreen, and hence the seek bar, of the mobile device. A user may find that in order to navigate to a preferred section of a video they have to make many small adjustments, for example, by moving the seek bar indicator backwards and forward multiple times before they arrive at the start point of the section that they wish to view. Similar issues arise with audio content when the user is attempting to navigate to a preferred section of the audio content. This issue is amplified due to the seek bar typically being a constant size relative to the size of a display of the computing device, rather than with respect to the length of the content (i.e., a long video would have the same length seek bar as a short video). This can lead to the same magnitude movement by a user adjusting a short video playback position by a few minutes, but for a long video the playback position is adjusted by tens of minutes.

In view of the foregoing, it would be beneficial to have a system that is capable of providing user experiences that allow users to accurately, and more conveniently, control a seek bar when using computing devices.

Systems and methods are described herein for adjusting a playback position of a media asset at a computing device. In accordance with an aspect of the disclosure, a method is provided for adjusting a playback position of a media asset at a computing device. The method includes receiving the media asset comprising a video and/or audio component and outputting the media asset at a first playback position at the computing device. A seek bar control is initiated and, in response to initiating the seek bar control, a grid is generated at the computing device. A user action for adjusting the playback position of the media asset is detected. Detecting the user action comprises determining a first location on the grid corresponding to a first playback position and determining a second playback position by determining that the user action has ended at a second location on the grid corresponding to the second playback position. The video and/or audio component of the media asset is output at the second playback position. In an example system, a user may view a video on a smartphone, for example the user may stream the video from an internet platform. The user may wish to navigate to a different part of the video. The user may initiate the navigation by selecting a seek bar indicator via a touchscreen of the smartphone. A grid is generated at the smartphone, in this example the grid is not displayed to the user but is used by the smartphone to track the movement of a user's finger from a first location to a second location. In this example, once the user stops moving their finger, the smartphone displays the video on the display of the smartphone at the playback position indicated by the user stopping their finger movement. In another example, user input may be provided by selecting a seek bar indicator with a cursor that is controlled by a mouse. In a manner similar to that described above, movement of the cursor may be tracked in order to determine a user's input for navigating video and/or audio playback.

The media asset may comprise a plurality of different segments, and initiating the seek bar control may further comprise displaying at least two seek bar control options. A first seek bar control option may comprise a control that enables a user to navigate between the different segments of the video. A second seek bar control option may comprise a control that enables a user to navigate within a segment of the different segments. For example, the first control option may allow a user to skip between different scenes of a movie, and the second control option may allow a user to navigate within a scene of the movie. A user may display the different seek bar options by, for example, touching a location on a touchscreen of a smartphone for an extended period of time. On detecting the longer touch, the smartphone may display the different seek bar options to the user via a display of the smart phone. The user may then select one of the options by sliding and/or flicking their finger to the option on the touchscreen. In another example, the user may remove their finger from the screen and touch the screen at a location that corresponds to the preferred option. In one example, the first control option may be indicated by a dashed line and the second control option may be indicated by a continuous line. In this way, a single seek bar can give the user enhanced navigation control, as the same seek bar can be used to navigate between segments of a video or within a segment of a video. Each segment may correspond to a topic, storyline, scene and/or song of the video.

The video component may be a video stream of a transport stream and/or the audio component may be an audio stream of a transport stream, and at least a subset of the plurality of segments may be identified by metadata from a data stream of the transport stream. For example, the data stream of a transport stream may comprise segment headings, such as song titles and/or scene titles. These headings may be output on a display of a computing device, such as a smartphone, along with the video and/or audio component. The headings may be displayed all the time, or, in another example, the headings may be displayed only when a user interacts with the seek bar and/or a control option.

The step of initiating the seek bar control may comprise any one of: selecting a seek icon; selecting a seek bar; pressing one or more seek buttons on the computing device; detecting user input at a predetermined location; and/or detecting a gesture at a close proximity to the display. The user action may comprise a dragging and/or a flicking action on the grid from the first location to the second location. This may, for example, be a dragging and/or a flicking action on a touchscreen of a display of a computing device, such as a smartphone. Determining that the user action has ended may comprise any one of: determining that the user action has stopped; determining that the user action has stabilized for a threshold period of time; determining that the distance between the first location and the second location has stabilized for a threshold period of time; and/or determining a second user action for outputting the media asset at the second playback position. In determining that the user action has ended, it may be determined that the user has stopped the dragging action, released contact from the display of the mobile device, or provided a further user input that indicates that the user wishes to set the playback position at the second playback position.

The second playback position may be determined based on a displacement of the second location with respect to the first location on the grid. A plurality of predetermined locations may be pre-set on the grid for the second location, each of the plurality of predetermined locations corresponding to a plurality of predetermined playback positions. The second playback position may be determined to be one of the plurality of predetermined playback positions.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which reference characters refer to like parts throughout, and in which.

The figures herein depict various embodiments of the disclosed invention for purposes of illustration only. It will be appreciated that additional or alternative structures, systems and methods may be implemented within the principles set out by the present disclosure.

DETAILED DESCRIPTION

Systems and methods are described herein for adjusting a playback position of a media asset. As referred to herein, a media asset and/or media content is any content that comprises audio and/or video. A media asset and/or media content refers to electronically consumable assets, such as live television programs, pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Media content may be recorded, played, displayed or accessed by computing devices, but can also be part of a live performance.

The disclosed methods and systems may be implemented on a computing device. A computing device is any device that can be used to access the content described above. As referred to herein, the computing device can be any device comprising a processor and memory, for example, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, an augmented reality device, a mixed reality device, a virtual reality device, or any other television equipment, computing equipment, or wireless device, and/or combination of the same.

Figure 1:
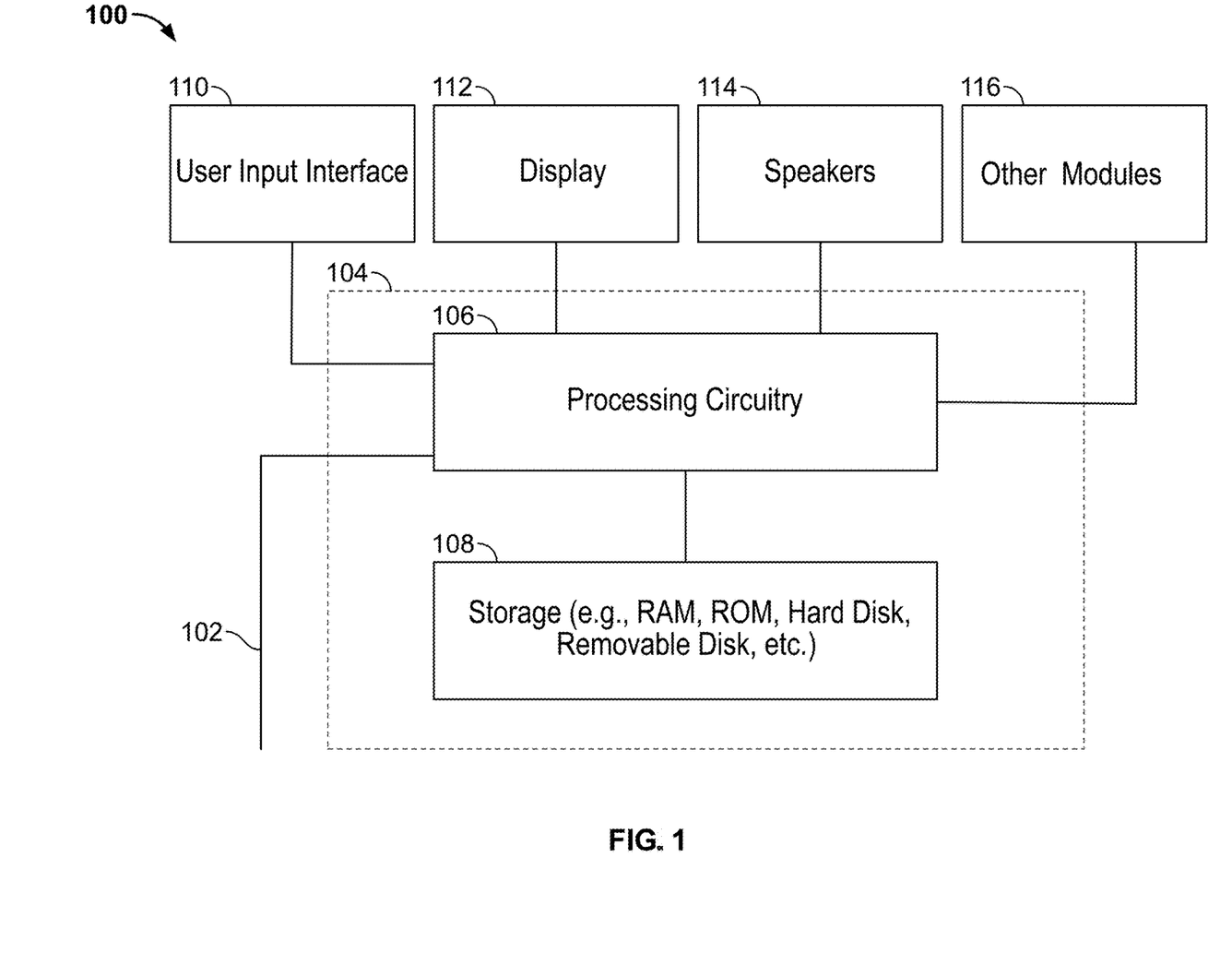
FIG. 1 shows an illustrative depiction of an example computing device, in accordance with some embodiments of the present disclosure.

Users may access content from one or more of their computing devices. FIG. 1 shows a generalized embodiment of illustrative computing device 100. More specific implementations of computing devices are discussed below in connection with FIG. 2. Computing device 100 may receive content and data via input/output (I/O) path 102. I/O path 102 may provide content (e.g., broadcast programming, on-demand programming, Internet content, content available over a local area network (LAN) or wide area network (WAN), and/or other content) and data to control circuitry 104, which includes processing circuitry 106 and storage 108. Control circuitry 104 may be used to send and receive commands, requests, and other suitable data using I/O path 102. I/O path 102 may connect control circuitry 104 (and specifically processing circuitry 106) to one or more communications paths (described below). I/O functions may be provided by one or more of these communications paths but, in this example, are shown as a single path in FIG. 1.

Control circuitry 104 may be based on any suitable processing circuitry such as processing circuitry 106. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexacore, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 104 executes instructions for a media application stored in memory (i.e., storage 108). Specifically, control circuitry 104 may be instructed by the media application to perform the functions discussed above and below. For example, the media application may provide instructions to control circuitry 104 to generate media displays (i.e., video). In some implementations, any action performed by control circuitry 104 may be based on instructions received from the media application.

In client/server-based embodiments, control circuitry 104 may include communications circuitry suitable for communicating with a media application server or other networks or servers. The instructions for carrying out the above-mentioned functionality may be stored on the media application server. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths (which are described in more detail in connection with FIG. 2). In addition, communications circuitry may include circuitry that enables peer-to-peer communication of computing devices, or communication of computing devices in locations remote from each other.

Memory may be an electronic storage device provided as storage 108, which is part of control circuitry 104. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorder, or PVRs), solid state devices, quantum storage devices, gaming consoles, gaming media, or any other suitable fixed or removable storage devices, and/or any combination of the same. Storage 108 may be used to store various types of content described herein as well as media data described above. Nonvolatile memory may also be used (e.g., to launch a boot-up routine and other instructions). Cloud-based storage, described in relation to FIG. 2, may be used to supplement storage 108 or instead of storage 108.

Control circuitry 104 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 104 may also include scaler circuitry for upconverting and downconverting content into the preferred output format of the computing device 100. Circuitry 104 may also include digital-to-analog converter circuitry and analog-to-digital converter circuitry for converting between digital and analog signals.

The tuning and encoding circuitry may be used by the computing device to receive and to display, to play, or to record content. The tuning and encoding circuitry may also be used to receive media data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 108 is provided as a separate device from computing device 100, the tuning and encoding circuitry (including multiple tuners) may be associated with storage 108.

A user may send instructions to control circuitry 104 using user input interface 110. User input interface 110 may be any suitable user interface, such as a remote control, mouse, trackball, keypad, keyboard, touchscreen, touchpad, stylus input, joystick, voice recognition interface, or other user input interfaces.

Display 112 may be provided as a stand-alone device or integrated with other elements of computing device 100. For example, display 112 may be a touchscreen or touch-sensitive display. In such circumstances, user input interface 110 may be integrated with or combined with display 112. Display 112 may be one or more of a monitor, liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

In some embodiments, display 112 may be HDTV-capable. In some embodiments, display 112 may be a 3D display, and the interactive media application and any suitable content may be displayed in 3D. A video card or graphics card may generate the output to the display 112. The video card may offer various functions such as accelerated rendering of 3D scenes and 2D graphics, MPEG5 2/MPEG-4 decoding, TV output, or the ability to connect multiple monitors. The video card may be any processing circuitry described above in relation to control circuitry 104. The video card may be integrated with the control circuitry 104. Speakers 114 may be provided as integrated with other elements of computing device 100 or may be stand-alone units. The audio component of videos and other content displayed on display 112 may be played through speakers 114. In some embodiments, the audio may be distributed to a receiver (not shown), which processes and outputs the audio via speakers 114.

Computing device 100 may also incorporate or be accessible to one or more other modules 116, for example, a detection module 116 including various components (e.g., a video detection component, an audio detection component, etc.) or one or more sensory modules (e.g., a contact touch sensory module, a proximity touch sensory module, etc.).

The media application may be implemented using any suitable architecture. For example, it may be a stand-alone application wholly implemented on computing device 100. In such an approach, instructions of the application are stored locally (e.g., in storage 108), and data for use by the application is downloaded on a periodic basis (e.g., from an out-of-band feed, from an Internet resource, or using another suitable approach). Control circuitry 104 may retrieve instructions of the application from storage 108 and process the instructions to generate any of the displays discussed herein. Based on the processed instructions, control circuitry 104 may determine what action to perform when input is received from input interface 110. For example, movement of a cursor on a display up/down may be indicated by the processed instructions when input interface 110 indicates that an up/down button was selected.

In some embodiments, the media application is a client/server-based application. Data for use by a thick or thin client implemented on computing device 100 is retrieved on demand by issuing requests to a server remote from the computing device 100. In one example of a client/server-based media application, control circuitry 104 runs a web browser that interprets web pages provided by a remote server. For example, the remote server may store the instructions for the application in a storage device. The remote server may process the stored instructions using circuitry (e.g., control circuitry 104) and generate the displays discussed above and below.

The client device may receive the displays generated by the remote server and may display the content of the displays locally on computing device 100. This way, the processing of the instructions is performed remotely by the server while the resulting displays are provided locally on computing device 100. Computing device 100 may receive inputs from the user via input interface 110 and transmit those inputs to the remote server for processing and generating the corresponding displays. For example, computing device 100 may transmit a communication to the remote server indicating that an up/down button was selected via input interface 110. The remote server may process instructions in accordance with that input and generate a display of the application corresponding to the input (e.g., a display that moves using a cursor up/down). The generated display is then transmitted to computing device 100 for presentation to the user.

In some embodiments, the media application is downloaded and interpreted or otherwise run by an interpreter or virtual machine (run by control circuitry 104). In some embodiments, the media application may be encoded in the ETV Binary Interchange Format (EBIF), received by control circuitry 104 as part of a suitable feed, and interpreted by a user agent running on control circuitry 104. For example, the media application may be an EBIF application. In some embodiments, the media application may be defined by a series of Java-based files that are received and run by a local virtual machine or other suitable middleware executed by control circuitry 104. In some of such embodiments (e.g., those employing MPEG-2 or other digital media encoding schemes), the media application may be, for example, encoded and transmitted in an MPEG-2 object carousel with the MPEG audio and video packets of a program.

Figure 2:
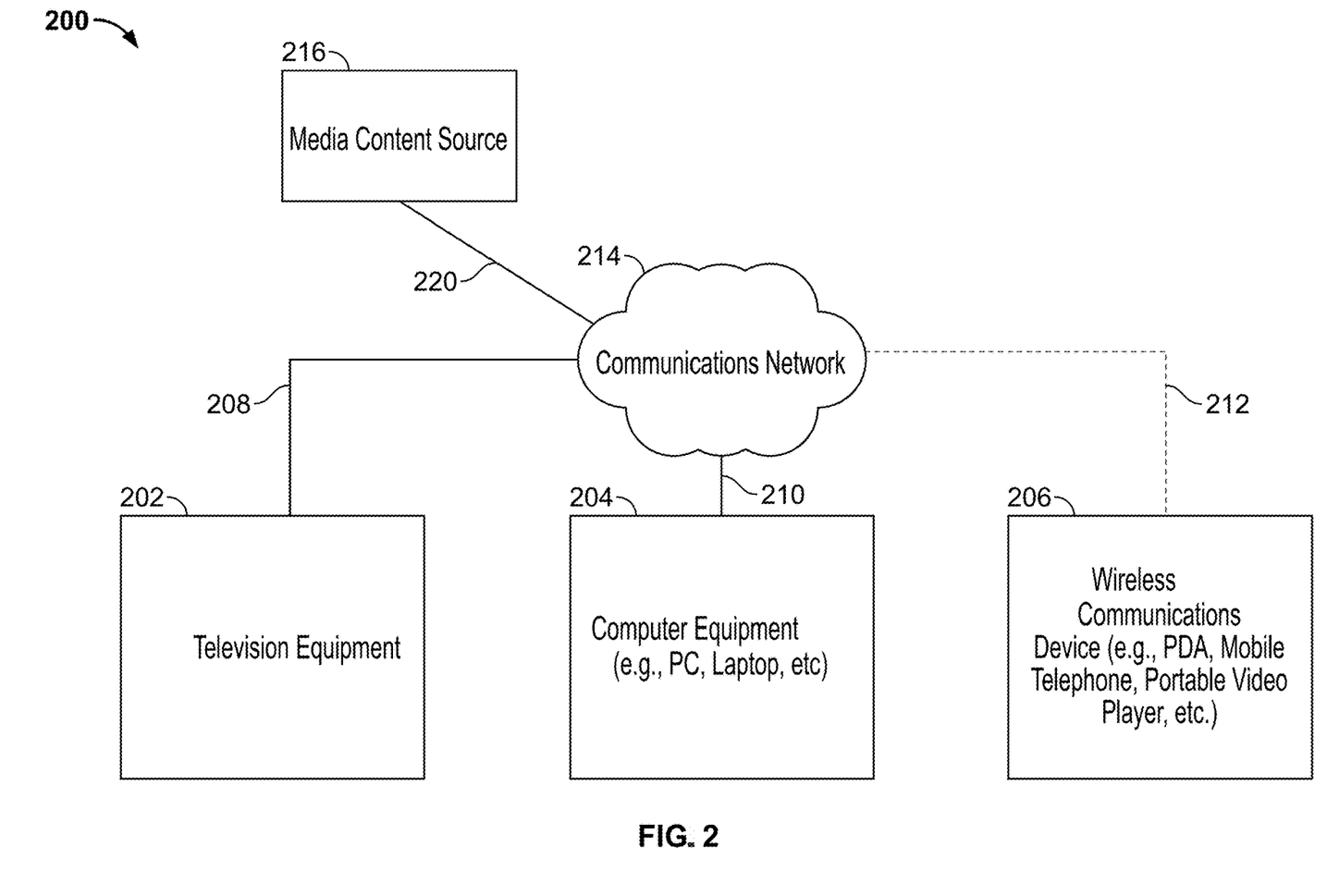
FIG. 2 shows a block diagram of an illustrative system, in accordance with some embodiments of the present disclosure.

Computing device 100 of FIG. 1 can be implemented in system 200 of FIG. 2 as television equipment 202, computer equipment 204, wireless communications device 206, or any other type of computing device suitable for accessing content. For simplicity, these devices may be referred to herein collectively as computing devices and may be substantially similar to computing devices described above. A computing device, on which a media application may be implemented, may function as a stand-alone device or may be part of a network of devices. Various network configurations of devices may be implemented and are discussed in more detail below.

A computing device utilizing at least some of the system features described above in connection with FIG. 1 may not be classified solely as television equipment 202, computer equipment 204, or a wireless communications device 206. For example, television equipment 202 may, like some computer equipment 204, be Internet-enabled, allowing for access to Internet content, while computer equipment 204 may, like some television equipment 202, include a tuner allowing for access to television programming. The media application may have the same layout on various different types of user equipment or may be tailored to the display capabilities of the user equipment. For example, on computer equipment 204, the media application may be provided as a website accessed by a web browser. In another example, the media application may be scaled down for wireless communications devices 206.

In system 200, there may be more than one of each type of computing device, but, in this example, only one of each is shown in FIG. 2. In addition, each user may utilize more than one type of computing device and also more than one of each type of computing device. In some embodiments, a computing device (e.g., television equipment 202, computer equipment 204, wireless communications device 206) may be referred to as a "second screen device" or "secondary device."

The user may also set various settings to maintain consistent media application settings, e.g., volume settings, across in-home devices and remote devices. Settings include programming preferences that the media application utilizes to make programming recommendations, display preferences, and other desirable guidance settings. For example, if a user sets a preferred volume level as a favorite volume level on, for example, a website on a mobile phone, the same settings would appear on the user's in-home and/or remote devices (e.g., user television equipment and user computer equipment), if desired. Therefore, changes made on one user equipment device can change the guidance experience on another user equipment device, regardless of whether they are the same or a different type of user equipment device. In a similar manner, if a user navigates from a first playback position to a second playback position of a video, for example from a first segment of a video to a second segment of a video, the same navigation changes may appear one or more of the user's in-home and/or remote devices. This sharing of settings and/or navigation positions may be facilitated by a user logging in to a user profile on the user's in-home and/or remote device, which enables the settings and/or navigation positions to be synchronized between the devices.

The computing devices may be coupled to communications network 214. Namely, television equipment 202, computer equipment 204, and wireless communications device 206 are coupled to communications network 214 via communications paths 208, 210, and 212, respectively. Communications network 214 may be one or more networks including the Internet, a mobile phone network, mobile voice or data network (e.g., a 5G, 4G or LTE network), cable network, public switched telephone network, or other types of communications network or combinations of communications networks. Paths 208, 210, and 212 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths.

Path 212 is drawn with dotted lines to indicate that in the exemplary embodiment shown in FIG. 2 it is a wireless path, and paths 208 and 210 are drawn as solid lines to indicate they are wired paths (although these paths may be wireless paths, if desired). Communications with the computing devices may be provided by one or more of these communications paths, but are, in this example, each shown as a single path in FIG. 2.

Although communications paths are not drawn between user equipment devices, these devices may communicate directly with each other via communication paths, such as those described above in connection with paths 208, 210, and 212, as well as other short-range point-to-point communication paths, such as USB cables, IEEE 1394 cables, wireless paths (e.g., Bluetooth, infrared, IEEE 702-11x, etc.), or other short-range communication via wired or wireless paths. BLUETOOTH is a certification mark owned by Bluetooth SIG, INC. The computing devices may also communicate with each other directly through an indirect path via communications network 214.

System 200 includes media content source 216 coupled to communications network 214 via communication path 220. Path 220 may include any of the communication paths described above in connection with paths 208, 210, and 212. Communications with the content source 216 may be exchanged over one or more communications paths but, in this example, are shown as a single path in FIG. 2. In addition, there may be more than one of each of content source 216 but, in this example, only one of each is shown in FIG. 2 (the different types of each of these sources are discussed below). Although communications between source 216 with computing devices 202, 204, and 206 are shown as through communications network 214, in some embodiments, source 216 may communicate directly with computing devices 202, 204, and 206 via communication paths (not shown) such as those described above in connection with paths 208, 210, and 212.

Content source 216 may include one or more types of content distribution equipment including a television distribution facility, cable system headend, satellite distribution facility, programming source (e.g., television broadcaster), intermediate distribution facility and/or server, Internet provider, on-demand media server, and other content providers. Content source 216 may be the originator of content (e.g., a television broadcaster, a Webcast provider, etc.) or may not be the originator of content (e.g., an on-demand content provider, an Internet provider of content of broadcast programs for downloading, etc.). Content source 216 may include cable sources, satellite providers, on-demand providers, Internet providers, over-the-top content providers, or other providers of content. Content source 216 may also include a remote media server used to store different types of content (including video content selected by a user), in a location remote from any of the user equipment devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media applications may be, for example, stand-alone applications implemented on user equipment devices. For example, the media application may be implemented as software or a set of executable instructions which may be stored in storage 108, and executed by control circuitry 104 of a computing device 100. In some embodiments, media applications may be client/server applications where only a client application resides on the user equipment device, and a server application resides on a remote server. For example, media applications may be implemented partially as a client application on control circuitry 104 of computing device 100 and partially on a remote server as a server application running on control circuitry of the remote server. When executed by control circuitry of the remote server, the media application may instruct the control circuitry to generate the media application displays and transmit the generated displays to the user equipment devices. The client application may instruct control circuitry of the receiving user equipment to generate the media application displays.

Content delivered to computing devices 202, 204, and 206 may be over-the-top (OTT) content. OTT content delivery allows Internet-enabled computing devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YouTube, Netflix, and Hulu, which provide audio and video via IP packets. YouTube is a trademark owned by Google Inc., Netflix is a trademark owned by Netflix Inc., and Hulu is a trademark owned by Hulu, LLC. In addition to content, providers of OTT content can distribute media guidance applications (e.g., web-based applications or cloud-based applications), or the content can be displayed by media guidance applications stored on the user equipment device.

System 200 is intended to illustrate various approaches, or network configurations, by which computing devices and sources of content may communicate with each other for the purpose of accessing content. The embodiments described herein may be applied in any approach that does not deviate from the teachings of this disclosure, for example in a system employing an approach for delivering content.

In an example approach, computing devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 214. These cloud resources may include one or more content sources 216. In addition, or in the alternative, the remote computing sites may include other computing devices, such as television equipment 202, computer equipment 204, and wireless communications device 206. For example, the other computing devices may provide access to a stored copy of a video or a streamed video.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

Cloud resources may be accessed by a computing device using, for example, a web browser, a media guidance application, a desktop application, a mobile application, and/or any combination of access applications of the same. The computing device may be a cloud client that relies on cloud computing for application delivery, or the user equipment device may have some functionality without access to cloud resources. For example, some applications running on the computing device may be cloud applications, i.e., applications delivered as a service over the Internet, while other applications may be stored and run on the computing device. In some embodiments, a computing device may receive content from multiple cloud resources simultaneously. For example, a computing device can stream audio from one cloud resource while downloading content from a second cloud resource. Or a computing device can download content from multiple cloud resources for more efficient downloading. In some embodiments, computing devices can use cloud resources for processing operations such as the processing operations performed by processing circuitry described in relation to FIG. 1.

Figure 3:
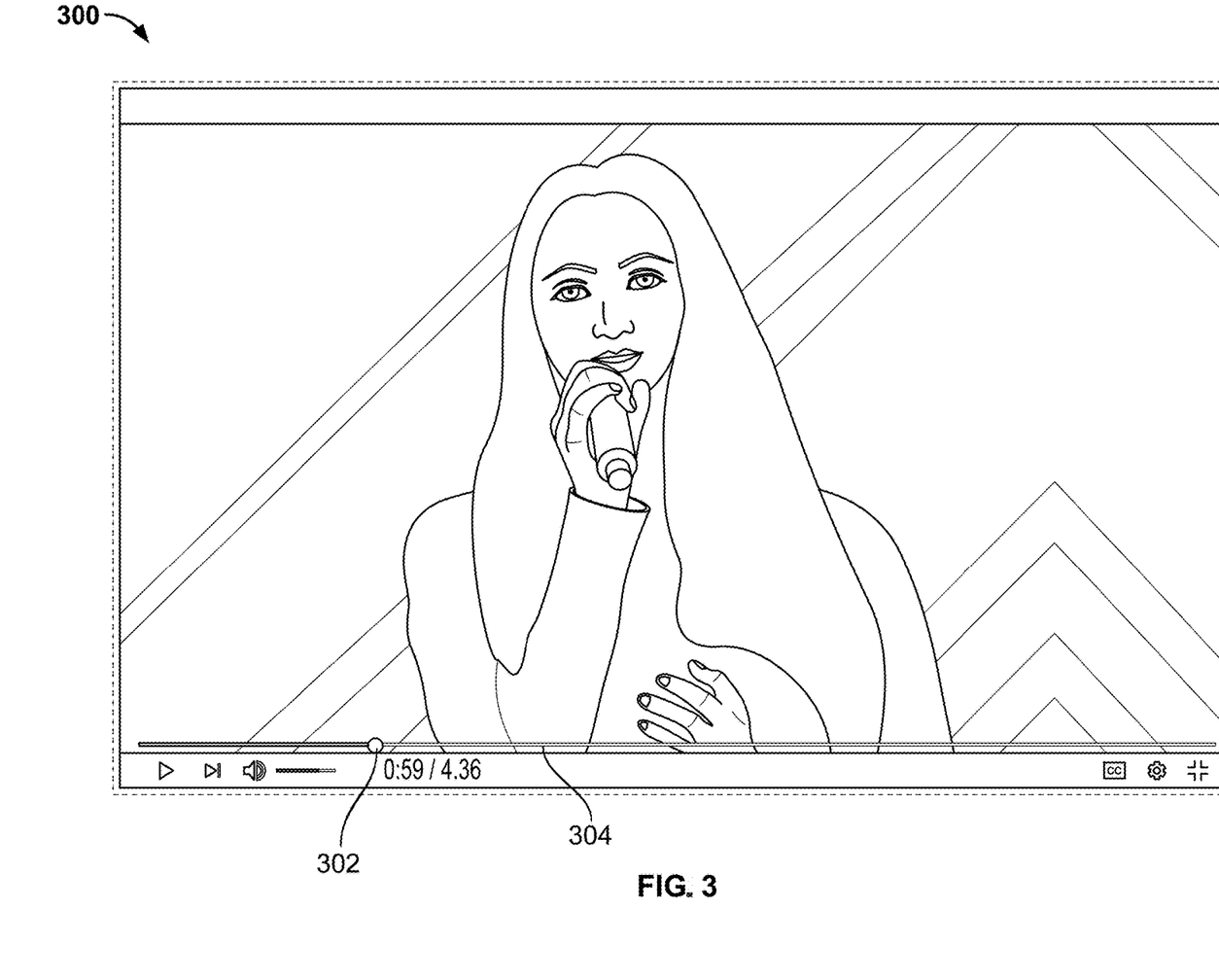
FIG. 3 shows an example user interface typically encountered by users when consuming media asset content, in accordance with conventional systems and methods.

FIG. 3 shows an example user interface 300 that users are typically faced with when consuming media assets. With reference to FIG. 3, problems that are commonly encountered by users when interacting with seek bars of conventional user interfaces, such as user interface 300, will now be described.

Small screen devices, e.g., mobile devices that play video or both video and audio, either offline or online, generally enable a user to navigate a playback position via a seek bar, e.g., a seek bar 304. Such a seek bar 304 may optionally include an seek bar indicator 302, which may be used by a user to interact with the seek bar and change the playback position. Such a seek bar can be controlled or adjusted to navigate backwards or forward within a video, when compared to a current playback position. In some cases, the seek bar 304 may not always be visible to the user. For example, the seek bar 304 indicating the playback position may be shown only when an input is received from a user, for example a touch event on a touchscreen of the mobile device. Only then can the user adjust the playback position of the video via the seek bar 304, making this a multi-input task for the user in such cases.

When adjusting the playback position of a video, user input is typically required. For example, the user may be required to drag a cursor or finger along the seek bar 304. The seek bar 304 is typically a horizontal or vertical bar that the user has to manually adjust. However, this is not so user-friendly, and the user has be careful when adjusting the playback position of the video. Otherwise, the user will be forced to repeatedly adjust the playback position by dragging the seek bar 304 back and forth in an attempt to reach the user's desired playback position. Additionally, the seek bar 304 may be inconveniently placed for the user. Although FIG. 3 shows a video player, similar issues arise with seek bars of audio-only players.

Figure 4:
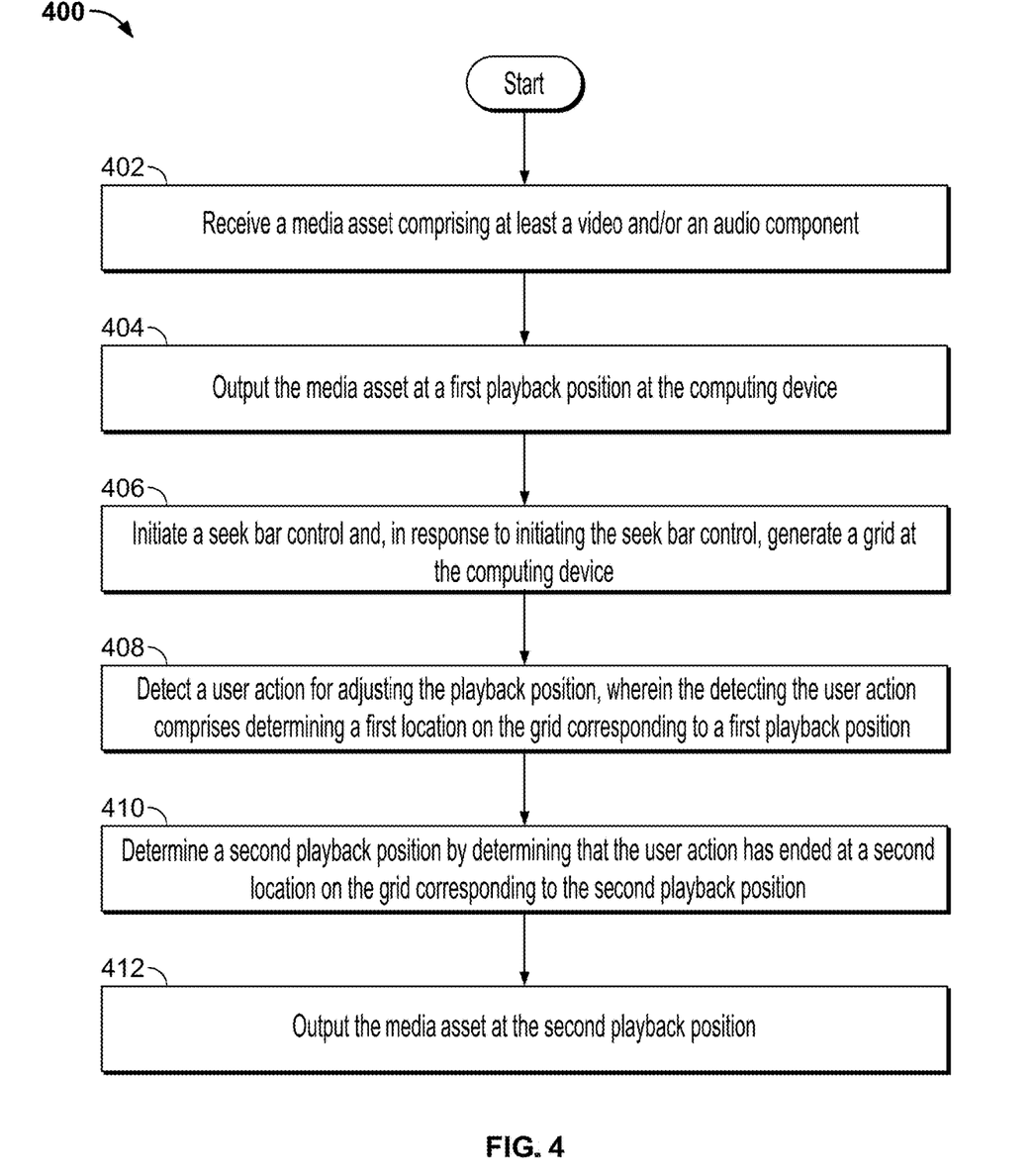
FIG. 4 is a flowchart of illustrative steps involved in controlling and adjusting a playback position of a media asset, in accordance with some embodiments of the present disclosure.

FIG. 4 is a flowchart representing a process for adjusting a video playback position of a media asset at a computing device, in accordance with some embodiments of the present disclosure. Process 400 may be implemented on any of the aforementioned devices shown in FIGS. 1-2. For example, process 400 may be executed by control circuitry 104 (FIG. 1) as implemented on computing equipment 202, 204, and/or 206 (FIG. 2). In addition, one or more steps of process 400 may be incorporated into or combined with one or more actions of any other process or embodiments described herein.

At step 402, the computing device receives a media asset comprising a video and/or an audio component.

At step 404, the user equipment device outputs the media asset at a first playback position at the computing device, e.g., on the mobile device. For example, the first playback position may be the initial playback position of the media asset or, if the playback position has already been adjusted by the user or has been adjusted automatically, the first playback position may be the current playback position from the mobile device.

At step 406, the user initiates a seek bar control and, in response to initiating the seek bar control, a 2D grid is generated at the computing device.

In some embodiments, the seek bar control may be initiated by a user selecting a seek bar indicator or seek bar displayed on the user's device, e.g., by contact touch on the display screen of the mobile device. In some embodiments, if seek bar control is initiated by user input using contact touch, the system may determine the point of contact on the display of the media device as the starting point for adjusting the playback position. In some embodiments, the seek bar control may be initiated using a proximity touch, e.g., detecting a gesture at a close proximity to the display screen of the mobile device (as will be further described with reference to FIG. 7), or any other user input.

In example embodiments, following the initiation of a seek bar control, a 2D grid (visible or invisible) may be generated for seek bar adjustment from the first playback position to a second playback position. For example, the second playback position can be determined based on a distance calculated between the first location and the second location on the 2D grid on the display of the mobile device. In some embodiments, determining the distance between the first location and the second location comprises determining a displacement of the second location with respect to the first location on the 2D grid, e.g., a 2D vector from the first location to the second location.

At step 408, a user action for adjusting the playback position is detected, wherein the detecting the user action comprises determining a first location on the grid corresponding to a first playback position. The user action, either by contact touch or proximity touch on the display of the mobile device, can be used to adjust the playback position and starts with a step of determining a first location on the 2D grid. In example embodiments, the first location on the 2D grid corresponds to the first playback position.

At step 410, a second playback position is determined by determining that the user action has ended at a second location on the grid corresponding to the second playback position. In example embodiments, the second location on the 2D grid corresponds to the second playback position. In some embodiments, the second playback position can be further determined or adjusted based on a user preference, a user profile, type of content, and/or historical playback positions, for example.

In some embodiments, the user action may be a continuous user action. For example, the user action may be provided by the user in the form of a dragging action on the 2D grid on the display screen of the mobile device from the first location to the second location. The dragging motion, for example, can be beneficial, as it allows the user to access the full range of playback positions.

In example embodiments, based on the user action, it can be determined whether the user wishes to navigate forward or backwards within the media asset. In some embodiments, for example, the initial direction of the user's dragging motion may determine whether the user navigates forward or backwards within the media asset. In this way, the user can drag in any direction from a first location, and the distance between the first location and the second location can be calculated to determine a playback position.

In example embodiments, substantially vertical or substantially horizontal user actions may indicate that the user wishes to navigate forward or backwards within the media asset. For example, given the 2D grid, a y-axis and an x-axis may be generated with the origin set as the location on the 2D grid where playback control has been initiated. In another example, the y-axis and the x-axis for the 2D grid may be generated with the origin set as an indicator on the seek bar, for example. In yet another example, the y-axis and the x-axis for the 2D grid may be generated with the origin set as the first location determined by the user, for example.

The user may navigate forward or backwards within the media asset as the distance between the first location and the second location may increase or decrease. The playback position may return to the initial playback position as the distance between the first location and the second location decreases to 0 or substantially 0. In one example, the user may navigate forward as the user's dragging action continuously moves away from the seek bar indicator icon, and the playback position may return to the initial playback position as the user's dragging motion returns to the seek bar indicator icon (i.e., such that the first and second location are the same, essentially resulting in no change in playback position).

In some embodiments, the user action can be determined to have ended if it is determined that the user has stopped the dragging action, and/or released contact from the display of the mobile device. In other embodiments, determining that the user action has ended may be based on, but not limited to, the user action stopping, the user action stabilizing for a threshold period of time, the distance between the first location and the second location stabilizing for a threshold period of time, and/or a second user action for outputting the media asset at the second playback position occurring.

At step 412, the computing device outputs the video and/or audio component of the media asset at the second playback position. It will be appreciated that the steps outlined in FIG. 4 may be repeated for further playback position adjustments.

Figure 5:
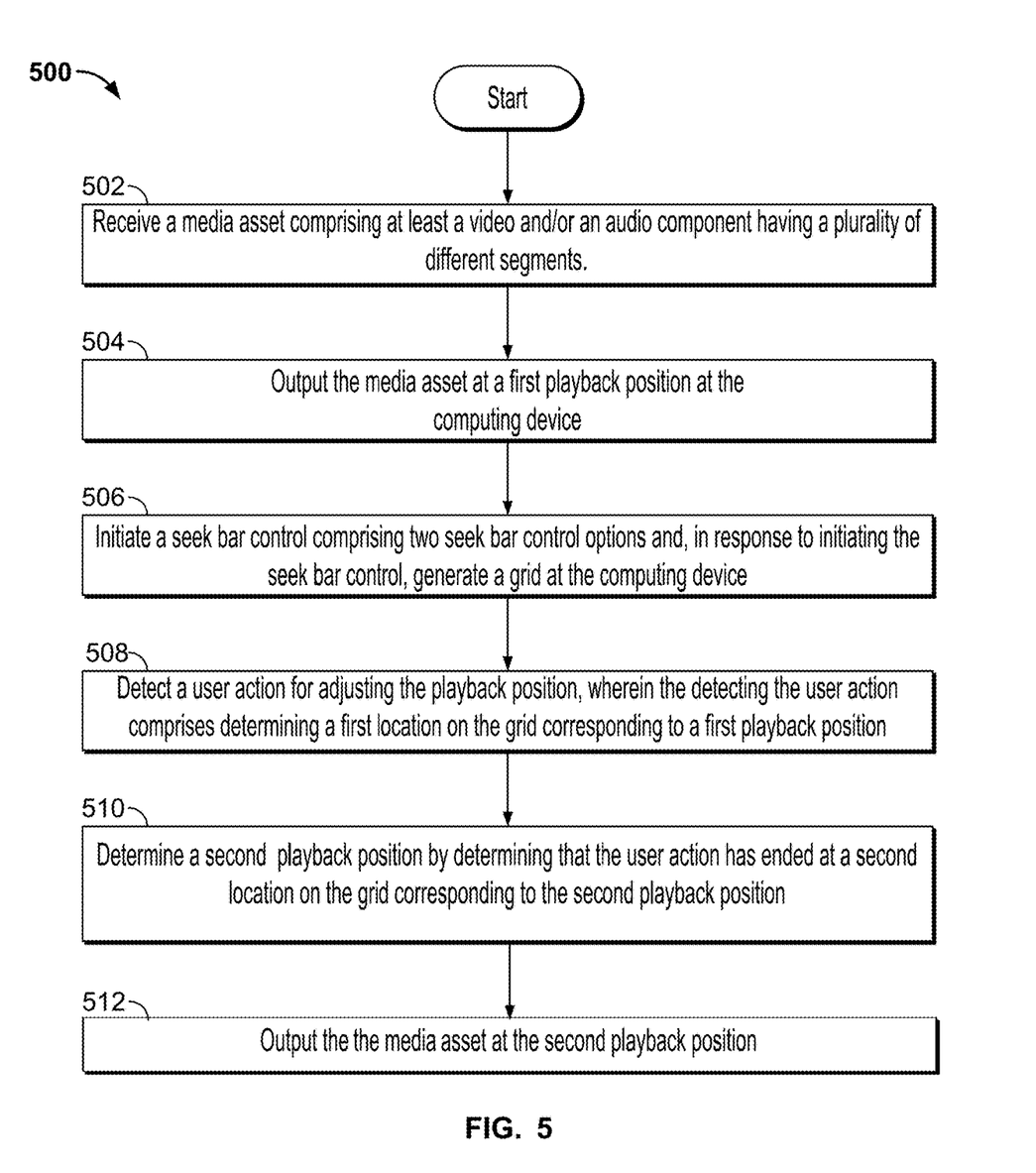
FIG. 5 is a flowchart of illustrative steps involved in controlling and adjusting a playback position of a media asset, in accordance with some embodiments of the present disclosure.

FIG. 5 is a flowchart representing a process for adjusting a video playback position of a media asset at a computing device, in accordance with some embodiments of the present disclosure. Process 500 may be implemented on any of the aforementioned devices shown in FIGS. 1-2. For example, process 500 may be executed by control circuitry 104 (FIG. 1) as implemented on computing equipment 202, 204, and/or 206 (FIG. 2). In addition, one or more steps of process 500 may be incorporated into or combined with one or more actions of any other process or embodiments described herein.

At step 502, the computing device receives a media asset comprising a video and/or an audio component.

At step 504, the user equipment device outputs the media asset at a first playback position at the computing device, e.g., on a mobile device. For example, the first playback position may be the initial playback position of the media asset or, if the playback position has already been adjusted by the user or has been adjusted automatically, the first playback position may be the current playback position on the mobile device.

At step 506, the user initiates a seek bar control and, in response to initiating the seek bar control, a 2D grid is generated at the computing device. The seek bar control may comprise two seek bar control options, wherein a first seek bar control option comprises a control that enables a user to navigate between the different segments and wherein a second seek bar control option comprises a control that enables a user to navigate within a segment of the different segments.

In some embodiments, the seek bar control may be initiated by a user selecting a seek bar indicator or seek bar displayed on the user's device and one of the seek bar control options, e.g., by contact touch on the display screen of the mobile device. In some embodiments, if seek bar control is initiated by user input using contact touch, the system may determine the point of contact on the display of the media device as the seek bar control option and the starting point for adjusting the playback position. In some embodiments, the seek bar control may be initiated using a proximity touch, e.g., detecting a gesture at a close proximity to the display screen of the mobile device (as will be further described with reference to FIG. 7), or any other user input.

In example embodiments, following the initiation of a seek bar control, a 2D grid (visible or invisible) may be generated for seek bar adjustment from the first playback position to a second playback position. For example, the second playback position can be determined based on the seek bar control option selected and on a distance calculated between the first location and the second location on the 2D grid on the display of the mobile device. In some embodiments, determining the distance between the first location and the second location comprises determining a displacement of the second location with respect to the first location on the 2D grid, e.g., a 2D vector from the first location to the second location.

At step 508, a user action for adjusting the playback position is detected, wherein the detecting the user action comprises determining a first location on the grid corresponding to a first playback position and a seek bar control option. The user action, either by contact touch or proximity touch on the display of the mobile device, can be used to adjust the playback position and starts with a step of determining a first location on the 2D grid. In example embodiments, the first location on the 2D grid corresponds to the first playback position.

At step 510, a second playback position is determined by determining that the user action has ended at a second location on the grid corresponding to the second playback position.

In example embodiments, the second location on the 2D grid corresponds to the second playback position. In some embodiments, the second playback position can be further determined or adjusted based on a user preference, a user profile, type of content, and/or historical playback positions, for example. If, for example, the user has selected a seek bar control option that comprises a control that enables a user to navigate between different segments, the second playback position may be in a different segment than the first playback position. If, in another example, the user has selected a seek bar control option that comprises a control that enables a user to navigate within a single segment, the second playback position may be in the same segment as the first playback position.

In some embodiments, the user action may be a continuous user action. For example, the user action may be provided by the user in the form of a dragging action on the 2D grid on the display screen of the mobile device from the first location to the second location. The dragging motion, for example, can be beneficial, as it allows the user to access the full range of playback positions.

In example embodiments, based on the user action, it can be determined whether the user wishes to navigate forward or backwards within the media asset. In some embodiments, for example, the initial direction of the user's dragging motion may determine whether the user navigates forward or backwards within the media asset. In this way, the user can drag in any direction from a first location, and the distance between the first location and the second location can be calculated to determine a playback position.

In example embodiments, substantially vertical or substantially horizontal user actions may indicate that the user wishes to navigate forward or backwards within the media asset. For example, given the 2D grid, a y-axis and an x-axis may be generated with the origin set as the location on the 2D grid where playback control has been initiated. In another example, the y-axis and the x-axis for the 2D grid may be generated with the origin set as an indicator on the seek bar, for example. In yet another example, the y-axis and the x-axis for the 2D grid may be generated with the origin set as the first location determined by the user, for example.

The user may navigate forward or backwards within the media asset as the distance between the first location and the second location may increase or decrease. The playback position may return to the initial playback position as the distance between the first location and the second location decreases to 0 or substantially 0. In one example, the user may navigate forward as the user's dragging action continuously moves away from the seek bar indicator icon, and the playback position may return to the initial playback position as the user's dragging motion returns to the seek bar indicator icon (i.e., such that the first and second location are the same, essentially resulting in no change in playback position).

In some embodiments, the user action can be determined to have ended if it is determined that the user has stopped the dragging action and released contact from the display of the mobile device. In other embodiments, determining that the user action has ended may be based on, but not limited to, these events: the user action has stopped, the user action has stabilized for a threshold period of time, the distance between the first location and the second location has stabilized for a threshold period of time, and/or a second user action for outputting the media asset at the second playback position has occurred.

At step 512, the computing device outputs the video and/or audio component of the media asset at the second playback position. It will be appreciated that the steps outlined in FIG. 5 may be repeated for further playback position adjustments.

Figure 6:
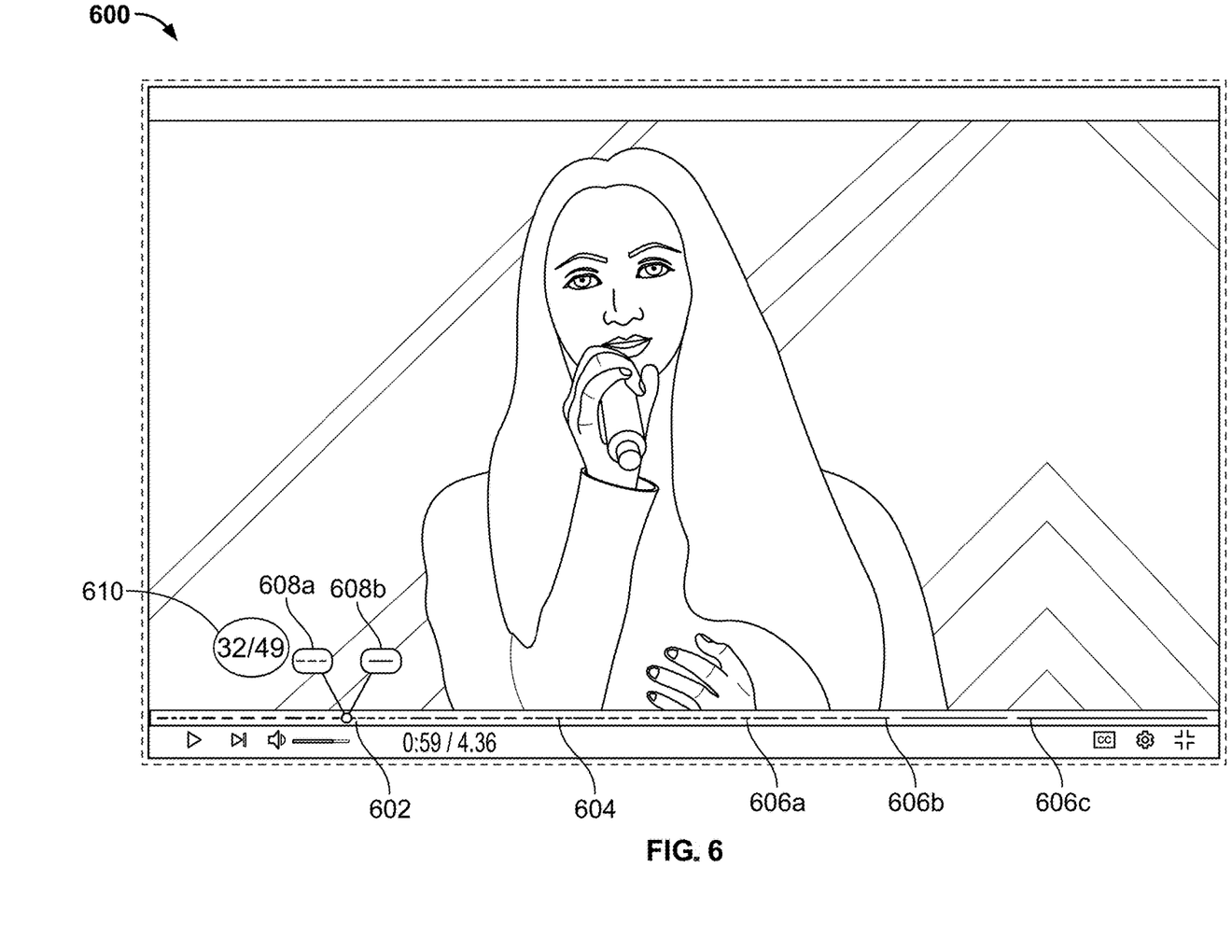
FIG. 6 shows an example illustration of a user interface, in accordance with some embodiments of the disclosure.

FIG. 6 shows an example illustration of a user interface 600, in accordance with some embodiments of the present disclosure.

The user interface 600 comprises a seek bar 604 having a plurality of segments 606a, 606b, 606c. In this example, a user interacts with the seek bar via seek bar indicator 602. The seek bar indicator 602 can be used to navigate through the media asset, which in this example is a video. By moving the seek bar indicator 602 right and left, the user can navigate forwards and backwards through the video.

When interacting with seek bar 604, for example by pressing on the seek bar indicator 602 (for example, by touching a location on a touchscreen of the device that corresponds with the seek bar indicator) for an extended period of time, the user is presented with two seek bar control options 608a, 608b. The first seek bar control option 608a displays a dashed line to the user. In this example, if the user selects the first seek bar control option 608a, the user can navigate between different segments of the video. The second seek bar control option 608b displays a continuous line to the user. In this example, if the user selects the second seek bar control option 608b, the user can navigate within a segment of the video.

In some embodiments, a segment indicator 610 may be shown to the user, e.g., 32/49 (i.e., the user has selected segment 32 of 49) when the user selects the first seek bar control option 608a. Displaying the segment number that the user is navigating to can help the user to adjust the playback position more accurately to reach their desired playback position. Additionally, as the user can see the segment number, there is no need for the user to repeatedly drag the seek bar indicator 602 back and forth to reach the user's desired playback position.

In example embodiments, it may be preferable that the seek bar, seek bar indicator icon and/or seek bar control options is/are positioned on the display of the mobile device at a section or region of the display screen that does not obstruct, or minimally obstructs, the user's view of the media asset being consumed. In some embodiments, the positioning of the seek bar, seek bar indicator and/or seek bar control options may be determined to be a location or locations on the display of the mobile device that obscure the least important area of the display screen, e.g., a corner section of the display screen.

In some embodiments, the seek bar adjustment user action, e.g., the dragging action, can be implemented vertically, horizontally, substantially vertically and/or substantially horizontally in order to bring uniformity to the seek bar control across computing devices. Alternatively, the user may determine whether the seek bar adjustment mechanism is to be placed or implemented vertically or horizontally based on his/her preference.

In some embodiments, a computing device (e.g., television equipment 202, computer equipment 204, wireless communications device 206) may be referred to as a "secondary device." For example, a secondary device may supplement content presented on a first computing device or display content as requested by the first computing device or vice versa, the first computing device being, for example, a mobile device. In some embodiments, the first computing device provides an interface for adjusting settings and display preferences of the secondary computing device. In this way, users may connect a mobile device (a first computing device) to a larger secondary device, for example, and use the mobile device as a control device for the larger secondary device, e.g., to control the playback position of the secondary device. For example, the smaller mobile device may be used as a touchpad for controlling settings of the secondary device or for interacting with the secondary device. The user may initiate a seek bar control using methods disclosed herein and, in some embodiments, may adjust the playback position of the secondary device using any of the user actions discussed above on the user's mobile device. For example, a dragging motion for playback position can be implemented on the display screen on the mobile device to navigate forward or backwards within a media asset on the secondary device.

Figure 7:
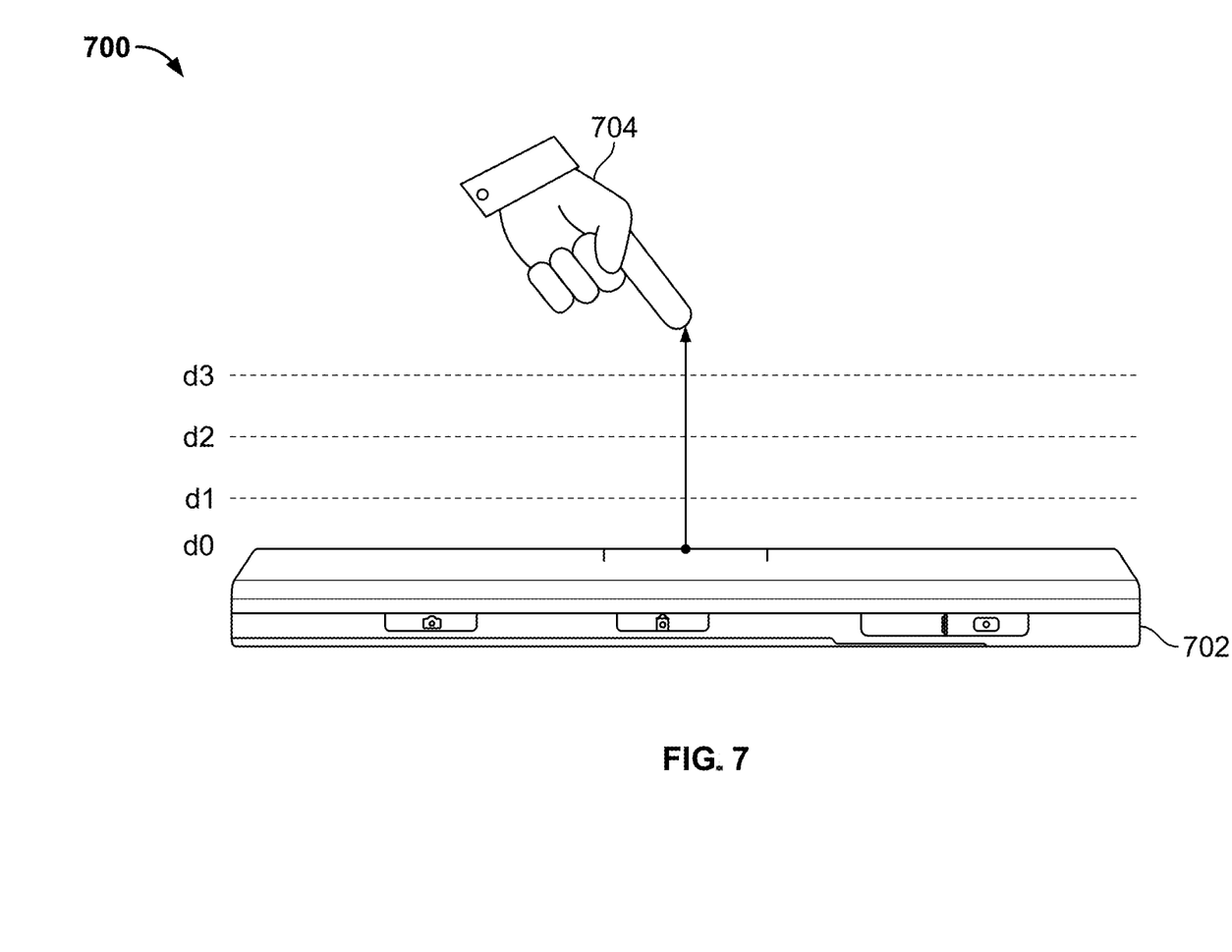
FIG. 7 shows an example illustration of using proximity touch to adjust a playback position of a media asset, in accordance with some embodiments of the present disclosure.

FIG. 7 shows an example diagram illustrating the concept of proximity depth of a proximity sensor. A proximity sensor (not shown) can be provided at an internal area of the mobile terminal 702 enclosed by the touchscreen or around the touchscreen. The proximity sensor is a sensor that detects a presence or non-presence of an object approaching a specific detecting surface or an object existing around the proximity sensor using an electromagnetic field strength or infrared ray without mechanical contact. Therefore, the proximity sensor may be more durable than a contact-type sensor and also provides wider utility than a contact-type sensor.

The proximity sensor may include, however is not limited to, a direct reflective photoelectric sensor, a mirror reflective photoelectric sensor, a radio frequency oscillation proximity sensor, an electrostatic capacity proximity sensor, a magnetic proximity sensor, an infrared proximity sensor or similar sensors. If the touchscreen includes an electrostatic capacity proximity sensor, it is configured to detect the proximity of a pointer using a variation of electric field according to the proximity of the pointer. In this case, the touchscreen (touch sensor) can be classified as the proximity sensor.

In the following description, an action where a pointer 704, e.g., a user's finger or a proximity pen, that approaches, without contacting, the touchscreen and is recognized as located on the touchscreen is called a "proximity touch," e.g., when the pointer 704 is between positions d0 and d3 as shown in FIG. 7. It will be appreciated that the proximity touch at different proximity levels, d1, d2, d3, between d1 and d2 and/or between d2 and d3, can be used to initiate different functions on the mobile terminal 702. An action where a pointer 704 touches the touchscreen, e.g., at position d0 as shown in FIG. 7, may be called a "contact touch." The position on the touchscreen proximity-touched by the pointer 704 is a position of the pointer or gesture that is opposite the display of the mobile device when the pointer performs the proximity touch. As illustrated in FIG. 7, when a pointer approaches the touchscreen, the proximity sensor provided within or in the vicinity of the touchscreen detects the approach or the gesture of the pointer and then outputs a signal in accordance with the gesture.

The proximity sensor detects a proximity touch and a proximity-touch pattern (e.g., a proximity-touch distance, duration, position, or any other gesture). Information corresponding to the detected proximity touch and the proximity-detected pattern can be output to the display of the mobile device. In this way, a gesture (using a proximity touch), e.g., picked up by a camera, or touchscreen recognition (using a contact touch), can be used to control a seek bar. For example, user actions may include, however are not limited to, flicking a pointer or a pen, clicking a button on the proximity pen or any other action stored on the mobile device used to detect or to determine that the user wishes to initiate seek bar control and/or adjust the playback position of the content being consumed. The user may initiate the seek bar control using a gesture and then, following the seek bar control initiation, adjust the playback position of the content on the mobile device using the dragging motion as discussed above.

Augmented reality (AR) is an interactive experience of a real-world environment where the objects that reside in the real world are enhanced by computer-generated perceptual information, sometimes across multiple sensory modalities, including visual, auditory, and haptic, to name a few. Virtual reality (VR), on the other hand, is a simulated experience that can be similar to or completely different from the real world. Extended reality (XR) is an umbrella term encapsulating augmented reality, virtual reality, mixed reality (MR), and everything in between. These applications can offer a wide range of revolutionary experiences to the user, and the same underlying systems and methods of seek bar adjustment described herein may be implemented in AR, VR, as well as other XR systems and applications. For example, seek bar adjustment may be done using a controller in a similar implementation to a proximity touch as described above.

It will be appreciated that the computing device may perform one or more of the functions described above simultaneously.

As referred herein, the term, "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. Additionally, any of the steps in said processes can be performed in any order, can be omitted, and/or can be combined with any of the steps from any other process.

While some portions of this disclosure may make reference to "convention," any such reference is merely for the purpose of providing context to the invention(s) of the instant disclosure, and does not form any admission as to what constitutes the state of the art.

What is claimed is:

1. A method of adjusting a playback position of a media asset at a computing device, the method comprising:
   receiving the media asset comprising a video and/or audio component;
   outputting the video and/or audio component of the media asset at a first playback position at the computing device;
   receiving, at the computing device, a touch event at a first location on a seek bar;
   in response to receiving the touch event:
     initiating a seek bar control at the first location; and
     generating, at the computing device, a two dimensional grid for adjusting the playback position of the media asset, wherein the grid comprises a plurality of columns and a plurality of rows, and wherein an origin of the two dimensional grid corresponds to the first location;
   adjusting a playback position of the media asset, wherein the adjusting comprises:

determining that continuous user input has been received between the first location and a second location on the grid, wherein the first location corresponds to the first playback position and the second location corresponds to a second playback position;

determining a direction of the continuous user input from the origin of the two dimensional grid, wherein the direction of the continuous user input corresponds to a direction of playback navigation;

determining a magnitude of a difference between the origin of the two dimensional grid and the second location on the two dimensional grid, wherein the magnitude of the difference corresponds to an amount of temporal change in the playback position; and determining the second playback position based on the determined direction of playback navigation and the determined amount of temporal change in the playback position; and outputting the video and/or audio component of the media asset at the second playback position.

2. The method of claim 1, wherein the media asset comprises a plurality of different segments and initiating the seek bar control further comprises, in response to receiving the touch event, concurrently displaying at least two seek bar control options based on the first location, wherein a first seek bar control option comprises a control that enables a user to navigate between the different segments and wherein a second seek bar control option comprises a control that enables a user to navigate within a segment of the different segments.

3. The method of claim 2, wherein:
the media asset comprises a plurality of different segments;
a user input associated with seeking to a segment of the plurality of segments is received; and
determining the second playback position further comprises navigating to a different segment or navigating within a segment, wherein the navigating to a different segment or navigating within a segment is synchronized with a user profile.

4. The method of claim 1, wherein the step of initiating the seek bar control comprises any one of: selecting a seek bar; pressing one or more seek buttons on the computing device; detecting user input at a predetermined location; and/or detecting a gesture at a close proximity to the display.

5. The method of claim 1, wherein the user action comprises a dragging and/or a flicking action on the grid from the first location to the second location.

6. The method of claim 1, wherein the second playback position is determined based on a displacement of the second location with respect to the first location on the grid.

7. The method of claim 1, wherein a plurality of predetermined locations for the second location are pre-set on the grid, each of the plurality of predetermined locations corresponding to a plurality of predetermined playback positions.

8. The method of claim 1, wherein determining that the user action has ended comprises any one of: determining that the user action has stabilized for a threshold period of time; determining that the distance between the first location and the second location has stabilized for a threshold period of time; and/or determining a second user action for outputting the media asset at the second playback position.

9. A system for adjusting a playback position of a media asset at a computing device, the system comprising:
control circuitry configured to:
receive the media asset comprising a video and/or audio component;
output the video and/or audio component of the media asset at a first playback position;
input circuitry configured to:
receive, at the computing device, a touch event at a first location on a seek bar;
the control circuitry also configured to, in response to receiving the touch event:
initiate a seek bar control at the first location; and
generate, at the computing device, a two dimensional grid for adjusting the playback position of the media asset, wherein the grid comprises a plurality of columns and a plurality of rows, and wherein an origin of the two dimensional grid corresponds to the first location;
adjust the playback position of the media asset, wherein the adjusting comprises:
determining that continuous user input has been received between the first location and a second location on the grid, wherein the first location corresponds to the first playback position and the second location corresponds to a second playback position;
determining a direction of the continuous user input from the origin of the two dimensional grid, wherein the direction of the continuous user input corresponds to a direction of playback navigation;
determining a magnitude of a difference between the origin of the two dimensional grid and the second location on the two dimensional grid, wherein the magnitude of the difference corresponds to an amount of temporal change in the playback position;
determining the second playback position based on the determined direction of playback navigation and the determined amount of temporal change in the playback position; and
output the video and/or audio component of the media asset at the second playback position.

10. The system of claim 9, wherein:
the media asset comprises a plurality of different segments; and
the control circuitry configured to initiate the seek bar control is configured initiate the seek bar control by, in response to receiving the touch event, concurrently displaying at least two seek bar control options based on the first location, wherein a first seek bar control option comprises a control that enables a user to navigate between the different segments and wherein a second seek bar control option comprises a control that enables a user to navigate within a segment of the different segments.

11. The system of claim 10, wherein:
the media asset comprises a plurality of different segments;
the input circuitry is also configured to receive a user input associated with seeking to a segment of the plurality of segments; and
the control circuitry configured to determine the second playback position is configured to determine the second playback position by navigating to a different segment or navigating within a segment, wherein the navigating to a different segment or navigating within a segment is synchronized with a user profile.

12. The system of claim 9, wherein the control circuitry configured to initiate the seek bar control further comprises control circuitry to receive any one of: a selection of a seek bar; a press of one or more seek buttons on the computing device; detection of user input at a predetermined location; and/or detection of a gesture at a close proximity to the display.

13. The system of claim 9, wherein the control circuitry configured to detect a user action is further configured to detect a user action comprising a dragging and/or a flicking action on the grid from the first location to the second location.

14. The system of claim 9, wherein the control circuitry configured to determine the second playback position is further configured to determine the second playback position based on a displacement of the second location with respect to the first location on the grid.

15. The system of claim 9, wherein the control circuitry is further configured to pre-set a plurality of predetermined locations on the grid for the second location, each of the plurality of predetermined locations corresponding to a plurality of predetermined playback positions.

16. The system of claim 9, wherein the control circuitry configured to determine that the user action has ended is further configured to: determine that the user action has stabilized for a threshold period of time; determine that the distance between the first location and the second location has stabilized for a threshold period of time; and/or determine a second user action for outputting the media asset at the second playback position.

17. The method of claim 1, wherein method further comprises:
    receiving an input associated with initiating the seek bar control; and
    generating a y-axis and an x-axis of the grid with an origin of the grid set as the location where the input associated with initiating the seek bar control was received.

18. The method of claim 1, wherein generating the grid further comprises not outputting the grid for display at the computing device.

19. The system of claim 9, wherein the control circuitry is further configured to:
    receive an input associated with initiating the seek bar control; and
    generate a y-axis and an x-axis of the grid with an origin of the grid set as the location where the input associated with initiating the seek bar control was received.

20. The system of claim 9, wherein the control circuitry for generating the grid is further configured to not output the grid for display at the computing device.

* * * * *